United States Patent
Borrelli et al.

(10) Patent No.: US 9,975,805 B2
(45) Date of Patent: *May 22, 2018

(54) GLASS ARTICLES WITH INFRARED REFLECTIVITY AND METHODS FOR MAKING THE SAME

(71) Applicant: Corning Incorporated, Corning, NY (US)

(72) Inventors: Nicholas Francis Borrelli, Elmira, NY (US); Karl William Koch, III, Elmira, NY (US); Joseph Francis Schroeder, III, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/276,097

(22) Filed: Sep. 26, 2016

(65) Prior Publication Data
US 2017/0008796 A1   Jan. 12, 2017

Related U.S. Application Data

(63) Continuation of application No. 14/353,172, filed as application No. PCT/US2012/061822 on Oct. 25, 2012, now Pat. No. 9,487,441.

(Continued)

(51) Int. Cl.
*B32B 17/00* (2006.01)
*B32B 7/02* (2006.01)
(Continued)

(52) U.S. Cl.
CPC ............ *C03C 21/005* (2013.01); *C03C 15/00* (2013.01); *C03C 21/002* (2013.01);
(Continued)

(58) Field of Classification Search
None
See application file for complete search history.

(56) References Cited

U.S. PATENT DOCUMENTS

| 2,647,068 A | 7/1953 | Bishop |
| 2,651,146 A | 9/1953 | Stookey |

(Continued)

FOREIGN PATENT DOCUMENTS

| CA | 2133931 A1 | 5/1995 |
| CN | 2307095 Y | 2/1999 |

(Continued)

OTHER PUBLICATIONS

S. Michel et al., "Ulratrafine measurements of the thermal shift of Fabry-Perot resonances," Optical Fabrication, Testing, and Metrology, III, Proc. of SPIE, 7102, 2008.*

(Continued)

*Primary Examiner* — David Sample
*Assistant Examiner* — Nicole T Gugliotta
(74) *Attorney, Agent, or Firm* — Russell S. Magaziner

(57) ABSTRACT

Glass articles with infrared reflectivity and methods for making the same are disclosed herein. In one embodiment, glass article having infrared reflectivity includes a first surface, a second surface and a body extending between the first and second surfaces. A plurality of discrete layers of metallic silver are formed in the body creating at least one optical cavity in the body. Each discrete layer may have a thickness T such that $100\ nm \leq T \leq 250\ nm$ and may be spaced apart from adjacent layers of metallic silver by a spacing $S \leq 500$. The glass article reflects at least a portion of electromagnetic radiation incident on the glass article having a wavelength from 800 nm to 2500 nm and transmits at least a portion of electromagnetic radiation incident on the glass article having a wavelength from 390 nm to 750 nm.

18 Claims, 6 Drawing Sheets

Related U.S. Application Data

(60) Provisional application No. 61/552,585, filed on Oct. 28, 2011.

(51) Int. Cl.

| | | |
|---|---|---|
| *C03C 17/00* | (2006.01) | |
| *C03C 21/00* | (2006.01) | |
| *C03C 15/00* | (2006.01) | |
| *C03C 23/00* | (2006.01) | |

(52) U.S. Cl.
CPC ..... *C03C 23/007* (2013.01); *Y10T 428/24975* (2015.01); *Y10T 428/265* (2015.01)

(56) References Cited

U.S. PATENT DOCUMENTS

| | | | |
|---|---|---|---|
| 2,748,020 A | | 5/1956 | Parsons et al. |
| 2,911,749 A | | 11/1959 | Stookey |
| 3,419,370 A | | 12/1968 | Cramer et al. |
| 3,495,963 A | | 2/1970 | Buckley et al. |
| 3,752,729 A | * | 8/1973 | Mochel .......... C03C 3/078 428/218 |
| 3,790,430 A | | 2/1974 | Mochel |
| 3,892,582 A | | 7/1975 | Simms |
| 4,179,181 A | | 12/1979 | Chang |
| 4,290,794 A | | 9/1981 | Wedding |
| 4,526,785 A | | 7/1985 | Trotter, Jr. |
| 5,071,206 A | | 12/1991 | Hood et al. |
| 5,246,792 A | | 9/1993 | Watanabe |
| 5,285,517 A | | 2/1994 | Wu |
| 5,317,324 A | | 5/1994 | Naito et al. |
| 5,442,367 A | | 8/1995 | Naito et al. |
| 5,510,173 A | | 4/1996 | Pass et al. |
| 5,550,546 A | | 8/1996 | Noneman et al. |
| 5,557,289 A | | 9/1996 | Ohara |
| 5,589,839 A | | 12/1996 | Lindenmeier et al. |
| 5,610,619 A | | 3/1997 | Zafar |
| 5,627,552 A | | 5/1997 | Farrar et al. |
| 5,631,638 A | | 5/1997 | Kaspar et al. |
| 5,738,529 A | | 4/1998 | Wedell et al. |
| 5,768,217 A | | 6/1998 | Sonoda et al. |
| 5,790,079 A | | 8/1998 | Zafar |
| 5,792,298 A | | 8/1998 | Sauer et al. |
| 5,801,663 A | | 9/1998 | Lindenmeier et al. |
| 5,821,904 A | | 10/1998 | Kakizawa et al. |
| 5,867,128 A | | 2/1999 | Sauer |
| 5,926,141 A | | 7/1999 | Lindenmeier et al. |
| 5,936,493 A | | 8/1999 | Hulderman et al. |
| 6,025,806 A | | 2/2000 | Deininger et al. |
| 6,211,814 B1 | | 4/2001 | Benjamin et al. |
| 6,229,493 B1 | | 5/2001 | Iijima |
| 6,236,372 B1 | | 5/2001 | Lindenmeier et al. |
| 6,275,157 B1 | | 8/2001 | Mays et al. |
| 6,307,515 B1 | | 10/2001 | Sauer et al. |
| 6,307,516 B1 | | 10/2001 | Zafar et al. |
| 6,313,796 B1 | | 11/2001 | Potin et al. |
| 6,369,768 B1 | | 4/2002 | Fusinski |
| 6,400,334 B1 | | 6/2002 | Lindenmeier et al. |
| 6,411,259 B1 | | 6/2002 | Wendt et al. |
| 6,452,557 B1 | | 9/2002 | Twort |
| 6,515,631 B1 | | 2/2003 | Nakamura et al. |
| 6,593,889 B1 | | 7/2003 | Raddant |
| 6,595,421 B2 | | 7/2003 | Detwiler |
| 6,608,597 B1 | | 8/2003 | Hadzoglou et al. |
| 6,652,711 B2 | | 11/2003 | Brcka et al. |
| 6,830,221 B1 | | 12/2004 | Janson et al. |
| 6,919,849 B2 | | 7/2005 | Yang |
| 6,937,198 B2 | | 8/2005 | Iijima et al. |
| 7,010,070 B2 | | 3/2006 | Li et al. |
| 7,071,886 B2 | | 7/2006 | Doi et al. |
| 7,106,263 B2 | | 9/2006 | Kuehne |
| 7,119,751 B2 | | 10/2006 | Li et al. |
| 7,123,202 B2 | | 10/2006 | Maeuser et al. |
| 7,126,539 B2 | | 10/2006 | Li et al. |
| 7,126,549 B2 | | 10/2006 | Li et al. |
| 7,157,023 B2 | | 1/2007 | Mears |
| 7,224,319 B2 | | 5/2007 | Kubba et al. |
| 7,333,059 B2 | | 2/2008 | Li et al. |
| 7,342,547 B2 | | 3/2008 | Maniwa et al. |
| 7,348,927 B2 | | 3/2008 | Mondadori et al. |
| 7,365,685 B2 | | 4/2008 | Takeuchi et al. |
| 7,400,152 B2 | | 7/2008 | Thole et al. |
| 7,498,993 B1 | | 3/2009 | Lee et al. |
| 7,505,002 B2 | | 3/2009 | Surittikul et al. |
| 7,545,333 B2 | | 6/2009 | Li et al. |
| 7,551,091 B2 | | 6/2009 | Bergman et al. |
| 7,564,416 B2 | | 7/2009 | Lindenmeier et al. |
| 7,586,451 B2 | | 9/2009 | Lee et al. |
| 7,586,452 B2 | | 9/2009 | Li et al. |
| 7,616,162 B2 | | 11/2009 | Hoffmeister et al. |
| 7,719,475 B2 | | 5/2010 | Kuehne |
| 7,742,005 B2 | | 6/2010 | Villarroel et al. |
| 7,742,006 B2 | | 6/2010 | Villarroel et al. |
| 7,834,815 B2 | | 11/2010 | Li et al. |
| 8,009,107 B2 | | 8/2011 | Li et al. |
| 8,026,858 B2 | | 9/2011 | Takaba et al. |
| 8,094,088 B2 | | 1/2012 | Shinkawa et al. |
| 8,181,483 B2 | | 5/2012 | Davis et al. |
| 8,326,586 B2 | | 12/2012 | Noh et al. |
| 8,350,766 B2 | | 1/2013 | Hisaeda |
| 8,427,381 B2 | | 4/2013 | Labrot et al. |
| 8,441,402 B2 | | 5/2013 | Gawronski et al. |
| 8,457,232 B2 | | 6/2013 | vanZelst et al. |
| 8,577,289 B2 | | 11/2013 | Schlub et al. |
| 8,634,764 B2 | | 1/2014 | Cruz et al. |
| 8,750,944 B2 | | 6/2014 | Rousu et al. |
| 8,754,819 B2 | | 6/2014 | Li et al. |
| 8,808,581 B2 | | 8/2014 | Vernooy et al. |
| 8,837,614 B2 | | 9/2014 | Li et al. |
| 9,487,441 B2 | * | 11/2016 | Borrelli .......... C03C 21/005 |
| 9,586,861 B2 | * | 3/2017 | Borrelli .......... C03C 21/005 |
| 2003/0098791 A1 | | 5/2003 | Carlson et al. |
| 2004/0107910 A1 | | 6/2004 | Nakata et al. |
| 2004/0173508 A1 | | 9/2004 | Deursen et al. |
| 2004/0194890 A1 | | 10/2004 | Moroz |
| 2004/0263405 A1 | | 12/2004 | Kogure et al. |
| 2005/0174290 A1 | | 8/2005 | Huang |
| 2007/0045264 A1 | | 3/2007 | Nekoda et al. |
| 2007/0082124 A1 | | 4/2007 | Hartig |
| 2007/0125126 A1 | | 6/2007 | Ichimura et al. |
| 2007/0279301 A1 | | 12/2007 | Hoffmeister et al. |
| 2009/0020761 A1 | | 1/2009 | Okazaki |
| 2009/0098350 A1 | | 4/2009 | Mears |
| 2009/0142568 A1 | | 6/2009 | Dejneka et al. |
| 2009/0233037 A1 | * | 9/2009 | Medwick ........ C03C 17/36 428/68 |
| 2010/0009154 A1 | | 1/2010 | Allan et al. |
| 2010/0028607 A1 | | 2/2010 | Lee et al. |
| 2010/0035038 A1 | | 2/2010 | Barefoot et al. |
| 2011/0032164 A1 | | 2/2011 | Villarroel et al. |
| 2011/0104840 A1 | | 5/2011 | Burdinski et al. |
| 2012/0019425 A1 | | 1/2012 | Lee et al. |
| 2012/0031560 A1 | | 2/2012 | Koshimizu |
| 2012/0038527 A1 | | 2/2012 | Tanaka |
| 2012/0139801 A1 | | 6/2012 | Oshima et al. |
| 2012/0280380 A1 | | 11/2012 | Kamgaing |
| 2013/0015053 A1 | | 1/2013 | Benveniste et al. |
| 2013/0229362 A1 | | 9/2013 | Liu et al. |
| 2014/0178663 A1 | | 6/2014 | Varshneya et al. |
| 2014/0266976 A1 | | 9/2014 | Lee et al. |
| 2014/0267990 A1 | | 9/2014 | Moon et al. |
| 2015/0162642 A1 | | 6/2015 | Tsujimura et al. |

FOREIGN PATENT DOCUMENTS

| | | |
|---|---|---|
| CN | 2394334 Y | 8/2000 |
| CN | 2494287 Y | 6/2002 |
| CN | 2689480 Y | 3/2005 |
| CN | 2689481 Y | 3/2005 |
| CN | 2726074 Y | 9/2005 |
| CN | 2735558 Y | 10/2005 |
| CN | 1266972 C | 7/2006 |
| CN | 2847561 Y | 12/2006 |
| CN | 200976391 Y | 11/2007 |

(56) References Cited

FOREIGN PATENT DOCUMENTS

| | | |
|---|---|---|
| CN | 201174421 Y | 12/2008 |
| CN | 201247810 Y | 5/2009 |
| CN | 201247811 Y | 5/2009 |
| CN | 201655957 U | 11/2010 |
| CN | 201725869 U | 1/2011 |
| CN | 102064378 A | 5/2011 |
| CN | 101242671 B | 6/2011 |
| CN | 201994408 U | 9/2011 |
| CN | 202103158 U | 1/2012 |
| CN | 102395225 A | 3/2012 |
| CN | 101345333 B | 5/2012 |
| CN | 202259685 U | 5/2012 |
| CN | 102503176 A | 6/2012 |
| CN | 202396003 U | 8/2012 |
| CN | 101345334 B | 9/2012 |
| CN | 102721333 A | 10/2012 |
| CN | 102856628 A | 1/2013 |
| CN | 202721268 U | 2/2013 |
| CN | 101820098 B | 3/2013 |
| CN | 102971907 A | 3/2013 |
| CN | 202817197 U | 3/2013 |
| CN | 101814650 B | 4/2013 |
| CN | 202969749 U | 6/2013 |
| CN | 202977721 U | 6/2013 |
| CN | 203165931 U | 8/2013 |
| CN | 103412227 A | 11/2013 |
| CN | 103647144 A | 3/2014 |
| CN | 203499299 U | 3/2014 |
| CN | 203499318 U | 3/2014 |
| CN | 203574091 U | 4/2014 |
| CN | 103872465 A | 6/2014 |
| CN | 103917049 A | 7/2014 |
| CN | 203883122 U | 10/2014 |
| DE | 102006060516 A1 | 6/2008 |
| DE | 102007028755 A1 | 12/2008 |
| EP | 325510 B1 | 4/1995 |
| EP | 1589606 A1 | 10/2005 |
| EP | 2597726 A1 | 5/2013 |
| EP | 2672565 A1 | 12/2013 |
| JP | 1093004 A | 4/1989 |
| JP | 7221525 A | 8/1995 |
| JP | 7315875 A | 12/1995 |
| JP | 7315876 A | 12/1995 |
| JP | 7315877 A | 12/1995 |
| JP | 9232846 A | 9/1997 |
| JP | 10276026 A | 10/1998 |
| JP | 11150416 A | 6/1999 |
| JP | 2000101324 A | 4/2000 |
| JP | 2001345620 A | 12/2001 |
| JP | 2002081975 A | 3/2002 |
| JP | 03385119 B2 | 3/2003 |
| JP | 2003124719 A | 4/2003 |
| JP | 2004058592 A | 2/2004 |
| JP | 03761013 B2 | 3/2006 |
| JP | 03761014 B2 | 3/2006 |
| JP | 2006079581 A | 3/2006 |
| JP | 2006121291 A | 5/2006 |
| JP | 2006222540 A | 8/2006 |
| JP | 2006251909 A | 9/2006 |
| JP | 2007269554 A | 10/2007 |
| JP | 2008172626 A | 7/2008 |
| JP | 2009004989 A | 1/2009 |
| JP | 04340072 B2 | 10/2009 |
| JP | 2010158035 A | 7/2010 |
| JP | 2011077792 A | 4/2011 |
| JP | 2011097187 A | 5/2011 |
| JP | 04831367 B2 | 12/2011 |
| JP | 05518371 B2 | 6/2014 |
| KR | 221270 B1 | 9/1999 |
| KR | 2006019325 A | 3/2006 |
| KR | 2006034754 A | 4/2006 |
| KR | 2007054452 A | 5/2007 |
| KR | 864452 B1 | 10/2008 |
| KR | 2010024602 A | 3/2010 |
| KR | 1036490 B1 | 5/2011 |
| KR | 1051537 B1 | 7/2011 |
| KR | 2011075512 A | 7/2011 |
| KR | 2012068102 A | 6/2012 |
| KR | 2012070355 A | 6/2012 |
| KR | 1273760 B1 | 6/2013 |
| KR | 2013078920 A | 7/2013 |
| KR | 1294158 B1 | 8/2013 |
| KR | 1360506 B1 | 2/2014 |
| TW | 490880 B | 6/2002 |
| TW | I241051 B | 10/2005 |
| TW | 201334285 A | 8/2013 |
| WO | 2011099423 A1 | 8/2011 |
| WO | 2013038784 A1 | 3/2013 |
| WO | 2014136650 A1 | 9/2014 |

OTHER PUBLICATIONS

Merriam-Webster Dictionary:https://www.merriam-webster.com/dictionary/piece. Copyright 2018.*
JP2014538984 Office Action dated Oct. 25, 2016, Japan Patent Office, 5 Pgs.
Latif et al.; "Gain and efficiency enhancement of compact and miniaturised microstrip antennas using multi-layered laminated conductors"; IET Microw. Antennas Propag., 2011, vol. 5, Iss. 4 (2010); pp. 402-411.
Bhattacharya et al.; "Periodic patterning in materials deposition by self-regulating diffusion-reaction processes"; Appl. Phys. Lett. 82, 3357 (2003).
Jain et al., "The development of nanosize silver particles in an ion exchanged silicate glass matrix", Journal of Non-Crystalline Solids, vol. 222, pp. 102-112, Dec. 11, 1997.
Pask et al.; "Study of Diffusion in glass"; Journal of the American Ceramic Society, vol. 26, No. 8; pp. 267-277.
Tsapatsis et al.; "Spontaneous Formation of Periodically Patterned Deposits by Chemical Vapor Deposition"; Journal of American Chemical Society, 122, © 2000; pp. 12864-12865.
V. E. Carter, "Metallic Coatings for Corrosion Control," Butterworth & Co (Publishers), 1977, pp. 15-16.
M. I. Lebedeva,† D. G. Vlachos,*,† and M. Tsapatsis‡; "Pattern Formation in Porous Media via the Liesegang Ring Mechanism"; Ind. Eng. Chem. Res. 2004, 43, 3073-3084.
Stern, Kurt; "The Liesegang Phenomenon": The University of Arkansas Institute of Science and Technology, Fayetteville, Arkansas; Sep. 10, 1953; pp. 79-99.

* cited by examiner

GLASS ARTICLES WITH INFRARED REFLECTIVITY AND METHODS FOR MAKING THE SAME

CROSS-REFERENCE TO RELATED APPLICATIONS

This application is continuation application of U.S. patent application Ser. No. 14/353,172, filed on Apr. 21, 2014, which claims the benefit of priority under 35 U.S.C. § 119 of U.S. Provisional Application Ser. No. 61/552,585, filed on Oct. 28, 2011, the contents of both disclosures relied upon and incorporated herein by reference in their entirety.

BACKGROUND

Field

The present specification generally relates to glass articles and, more specifically, to glass articles with infrared reflectivity and methods for making the same.

Technical Background

Infrared electromagnetic radiation received from the sun is responsible for as much as 49% of the irradiative heating of the earth. When such radiation is incident on an object, such as a vehicle and/or a building, the radiation heats the object which, in turn, necessitates the consumption of energy to maintain the object at a lower desired temperature. For example, infrared electromagnetic radiation incident on a vehicle on a summer day considerably raises the temperature in the passenger compartment of the vehicle thereby necessitating operation of the air conditioning to maintain the passenger compartment at a comfortable temperature for vehicle occupants. However, operating the air conditioning requires the consumption of energy thereby decreasing the overall energy efficiency of the vehicle.

In order to minimize the thermal effects of infrared radiation on objects such as vehicles and/or buildings, various surface coatings have been utilized on the glazings. These coatings increase the infrared reflectivity of the glazing while, at the same time, having some degree of transparency to wavelengths of electromagnetic radiation in the visible spectrum. However, because these coatings are applied to the surface of the glazing, the coatings are subject to damage through physical contact and/or degradation by exposure to the elements.

Accordingly, a need exists for alternative glazing which at least partially reflects infrared electromagnetic radiation, is at least partially transparent to visible electromagnetic radiation and has improved durability.

SUMMARY

According to one embodiment, a glass article having infrared reflectivity includes a first surface, a second surface and a body extending from the first surface to the second surface. A plurality of discrete layers of metallic silver are formed in the body. Each of the plurality of discrete layers of metallic silver has a thickness T such that 100 nm $\leq T \leq 250$ nm. Each of the plurality of discrete layers of metallic silver is spaced apart from an adjacent layer of metallic silver by a spacing S such that $S \leq 500$ nm thereby forming at least one optical cavity in the body. The glass article reflects at least a portion of electromagnetic radiation incident on the glass article having a wavelength from 800 nm to 2500 nm and transmits at least a portion of electromagnetic radiation incident on the glass article having a wavelength from 390 nm to 750 nm.

In another embodiment, a method for forming a glass article with infrared reflectivity may include providing an ion-exchangeable glass article having a first surface, a second surface and a body extending from the first surface to the second surface. Sodium ions in the glass substrate are then exchanged for silver ions. Thereafter, the silver ions in the glass substrate are formed into a plurality of discrete layers of metallic silver in the body of the glass article. Each layer of the plurality of discrete layers of metallic silver is contained within the body of the glass article and is spaced apart from an adjacent layer of metallic silver such that the plurality of discrete layers of metallic silver form at least one optical cavity in the glass article.

In another embodiment, a method for forming a glass article with infrared reflectivity, includes providing an ion-exchangeable glass article having a first surface, a second surface and a body extending from the first surface to the second surface. The glass article is positioned in a first salt bath comprising $KNO_3$ to diffuse $K^{+1}$ ions into the glass article thereby forming a layer of compressive stress in the glass article. Thereafter, the glass article is positioned in a second salt bath comprising from about 0.05 wt. % to about 5 wt. % $AgNO_3$ and from about 95 wt. % to about 99.95 wt. % of $MNO_3$, wherein M is an alkali metal. The glass article is held in the second bath for an ion exchange period P, wherein 5 minutes$\leq P \leq 1$ h and subsequently removed. The glass article is then positioned in a stream of flowing hydrogen gas and heated in the stream of flowing hydrogen gas to a reducing temperature from about 250° C. to about 300° C. for a treatment period Q to form a plurality of discrete layers of metallic silver in the body of the glass article, wherein 1 h$\leq Q \leq 50$ h.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
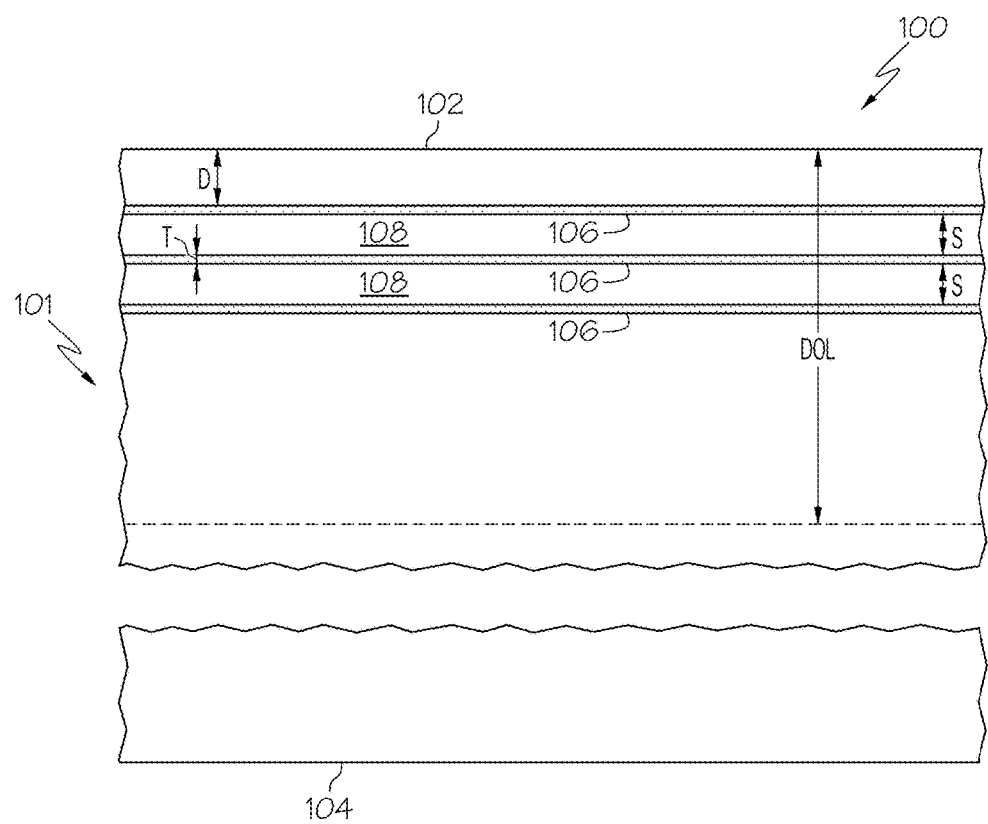
FIG. 1 schematically depicts a partial cross section of a glass article having infrared reflectivity according to one or more embodiments shown and described herein.

Reference will now be made in detail to embodiments of glass articles with infrared reflectivity, examples of which are depicted in the attached drawings. Methods for forming the glass articles will also be described. Whenever possible, the same reference numerals will be used throughout the drawings to refer to the same or like parts. One embodiment of a glass article with infrared reflectivity is schematically depicted in FIG. 1. The glass article generally comprises a first surface, a second surface, and body extending between the first surface and the second surface. A plurality of discrete layers of metallic silver are formed in the body such that the discrete layers form at least one optical cavity in the body. Each discrete layer of metallic silver generally has a thickness T such that 100 nm $\leq T \leq 250$ nm. Each discrete layer of metallic silver is generally spaced apart from an adjacent layer of metallic silver by a spacing S such that $S \leq 500$ nm. The glass article reflects at least a portion of electromagnetic radiation incident on the glass article having a wavelength from 800 nm to 2500 nm and transmits at least a portion of electromagnetic radiation incident on the glass article having a wavelength from 390 nm to 750 nm. The glass articles and methods for forming the glass articles will be described in more detail herein with specific reference to the appended drawings.

Referring to FIG. 1, a partial cross section of one embodiment of a glass article 100 is schematically depicted. The glass article 100 generally comprises a first surface 102, a second surface 104 and a body 101 which extends from the first surface 102 to the second surface 104. The body 101 is continuous with the first surface 102 and the second surface 104 such as when the glass article is formed from a single piece of glass. The glass article 100 may have a variety of different forms. For example, in some embodiments, the first surface 102 and the second surface 104 may be parallel with one another such as when the glass article is window glazing for use in commercial or residential buildings. Alternatively, the glass article 100 may have some degree of curvature along its length and/or width dimensions, such as when the glass article is automotive glazing for use in windows, windshields and roof panels of automobiles, trucks and the like.

The glass article 100 is generally formed from a glass composition which is ion-exchangeable in order to facilitate the formation of a plurality of discrete layers of metallic silver in the cross section of the glass substrate, as will be described in more detail herein. Glass compositions suitable for ion exchange generally comprise smaller alkali metal ions, typically Na⁺ or Li⁺ ions, that can be exchanged with larger alkali ions such as, for example, potassium, rubidium, and/or cesium ions, or even non-alkali metal ions, such as silver. However, it should be understood that any glass composition suitable for ion exchange can be used to form the glass articles described herein.

For example, suitable glass compositions that can be used to form the glass articles described herein include, without limitation, soda lime glasses, alkali-aluminosilicate glasses, alkali-borosilicate glasses, or any glass composition with a sufficient amount of ions in the glass network to facilitate ion exchange. Exemplary glasses include, without limitation, the glasses disclosed in commonly assigned U.S. Patent Application Publication Nos. 2010/0035038, 2010/0028607, 2010/0009154, 2009/0020761 and 2009/0142568.

Figure 2:
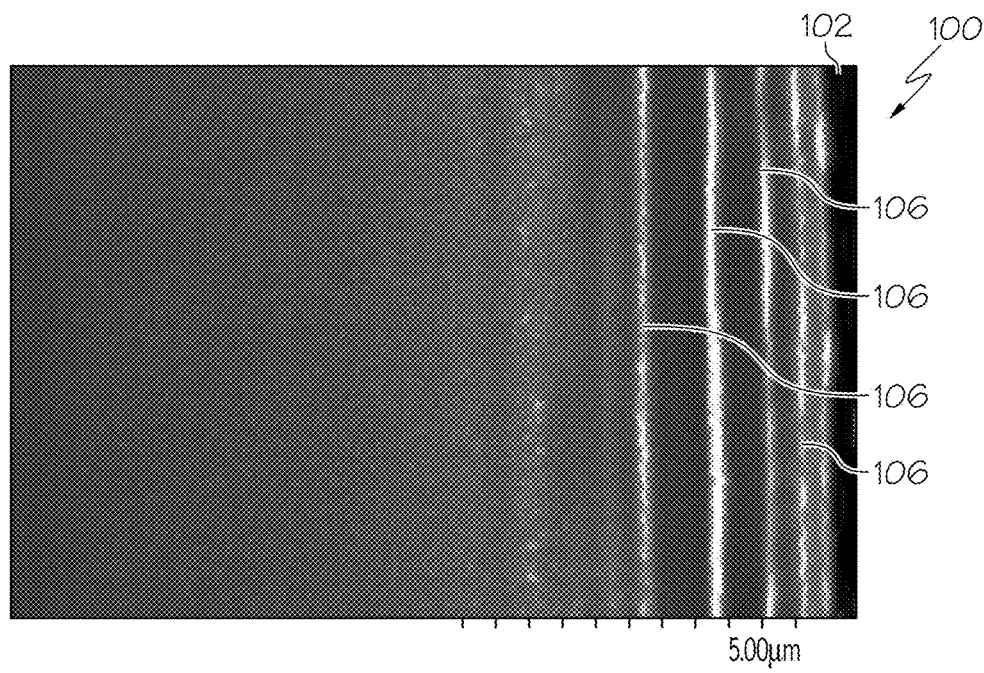
FIG. 2 is an SEM micrograph depicting a glass article with a plurality of discrete layers of metallic silver formed in the body of the glass article.
Figure 3A:
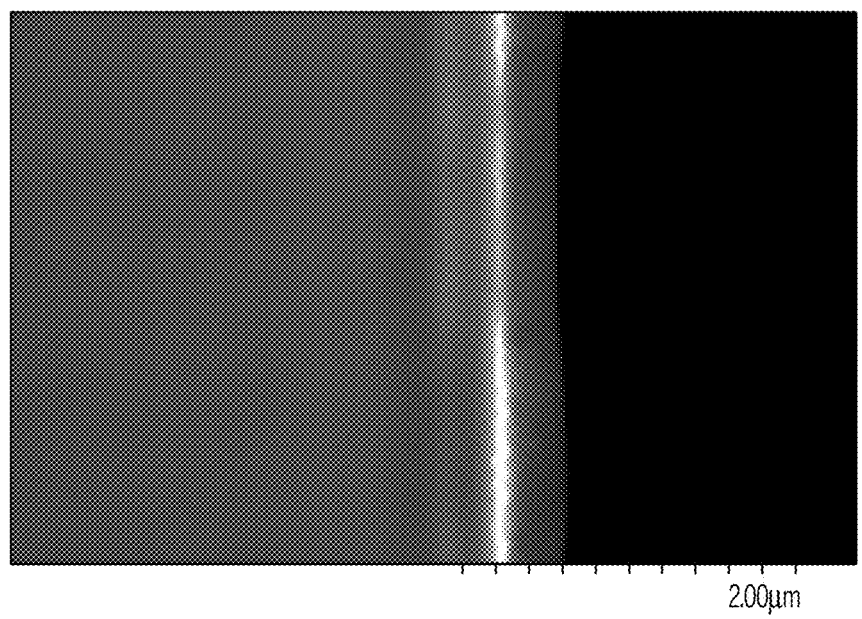
FIGS. 3A-3D are SEM micrographs depicting the formation of layers of metallic silver in a glass article for different hydrogen treatment times.
Figure 3B:
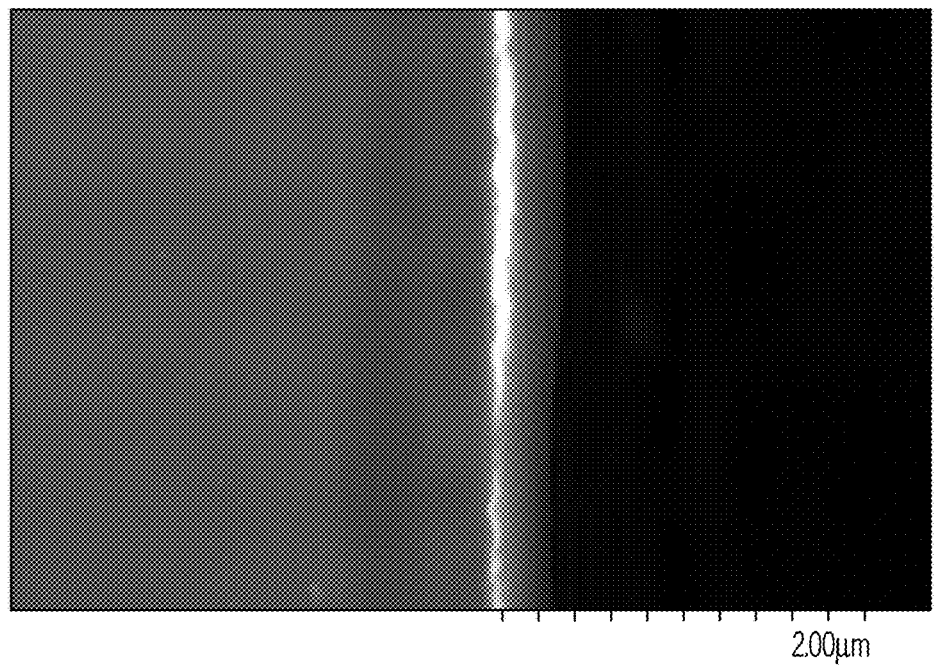
Figure 3C:
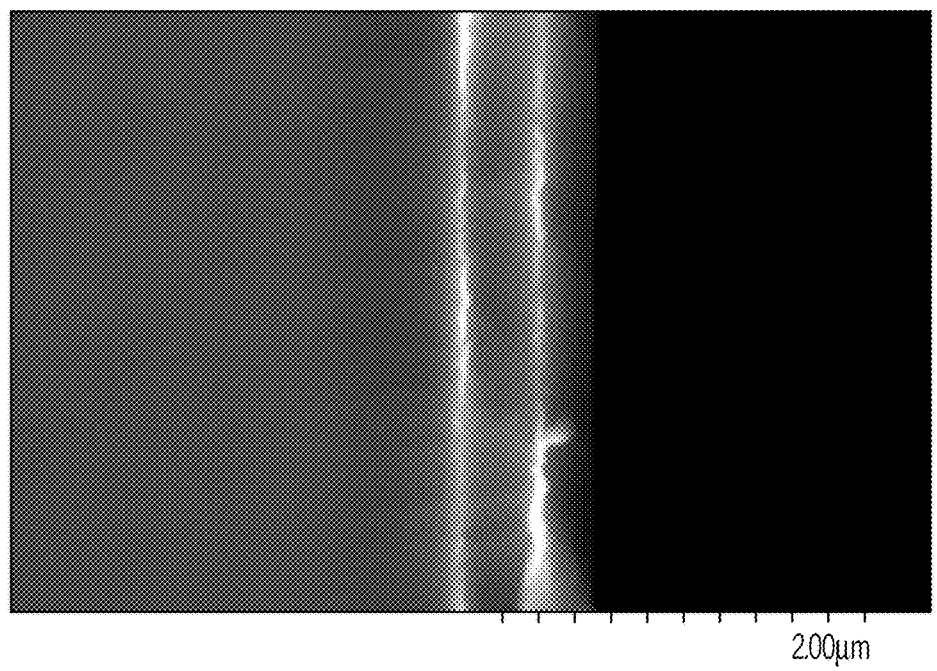
Figure 3D:
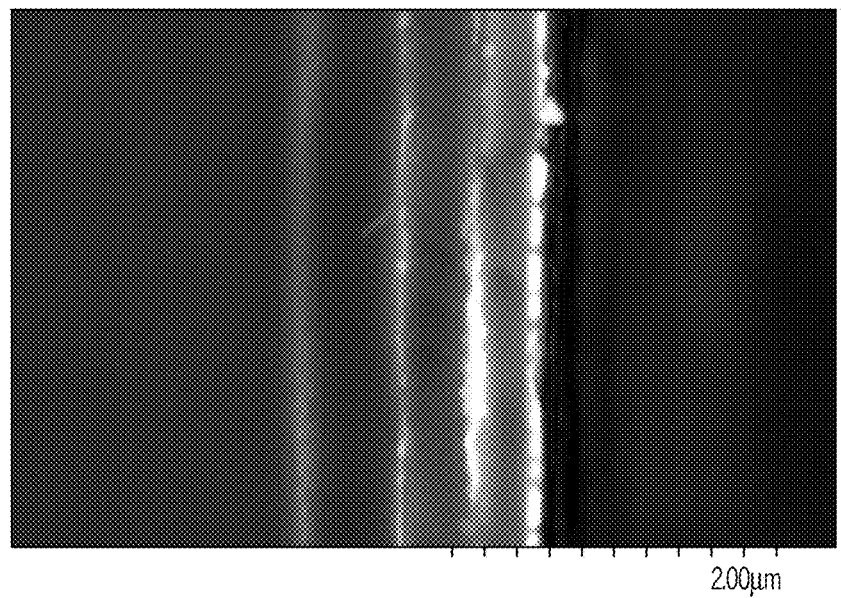

In the embodiments described herein, the glass articles further comprise a plurality of discrete layers 106 of metallic silver which are formed in the body 101. The discrete layers 106 of metallic silver are spaced apart such that at least one optical cavity 108 is formed between the layers of metallic silver. The optical cavities may be formed between adjacent layers of metallic silver or, alternatively, between layers of metallic silver which are separated by one or more intermediate layers of metallic silver. For example, in the embodiment of the glass article 100 schematically depicted in FIG. 1, three discrete layers 106 of metallic silver are formed in the body 101 of the glass article such that two optical cavities are formed between the adjacent layers of metallic silver. Alternatively, a single optical cavity may be formed between the first and third layers of metallic silver with the second layer of metallic silver positioned within the optical cavity. Moreover, it should be understood that the glass article 100 may be formed with fewer than three layers of metallic silver (i.e., two layers) or more than three layers of metallic silver. As such, it should be understood that the number of optical cavities formed in the glass article 100 may be greater than or equal to 1. By way of further example, FIG. 2 is an SEM micrograph of one exemplary embodiment of a glass article, specifically a glass substrate, having a plurality of discrete layers 106 of metallic silver formed beneath the first surface 102 of the glass article 100.

The optical cavities 108 act as Fabry-Perot resonators which produce high specular reflection of specific wavelengths of electromagnetic radiation incident on the glass article. In particular, a predetermined amount (i.e., a percentage) of reflection for a specific wavelength of electromagnetic radiation incident on the glass substrate can be obtained by adjusting the spacing S between the layers of metallic silver. In the embodiments described herein, the glass article reflects at least a portion of electromagnetic radiation incident on the glass article having a wavelength from 800 nm to 2500 nm (i.e., electromagnetic radiation in the near infrared spectrum) and transmits at least a portion of electromagnetic radiation incident on the glass article having a wavelength from 390 nm to 750 nm (i.e., electromagnetic radiation in the visible spectrum). For example, in some embodiments, the glass article has an infrared reflectance $R_{IR}$ such that $25\% \leq R_{IR} \leq 50\%$ or even $25\% \leq R_{IR} \leq 35\%$ for certain wavelengths of electromagnetic radiation incident on the glass article within a wavelength range from 800 nm to 2500 nm in the near infrared spectrum while still permitting some wavelengths of electromagnetic radiation in the visible portion of the electromagnetic spectrum to be transmitted through the glass article. The reflectance $R_{IR}$ of the glass article is generally greater than or equal to 10% for wavelengths of incident electromagnetic radiation greater than 2000 nm. In some embodiments, the glass article has a visible transmittance $T_V$ such that $10\% \leq T_V \leq 40\%$ for certain wavelengths of electromagnetic radiation incident on the glass article within the wavelength range from 390 nm to 750 nm in the visible spectrum. In some other embodiments, the glass article has a visible transmittance $T_V$ such that $10\% \leq T_V \leq 20\%$ for certain wavelengths of electromagnetic radiation incident on the first surface of the glass article within the wavelength range from 390 nm to 750 nm in the visible spectrum. For example, $T_V$ may be such that $10\% \leq T_V \leq 15\%$ for wavelengths of electromagnetic radiation of 500 nm to 600 nm and/or for wavelengths of electromagnetic radiation from 600 nm to 700 nm.

The reflectance and transmittance properties of the glass article 100 are facilitated by the thickness T and spacing S of the plurality of discrete layers of metallic silver in the body 101. In general, the thickness T of the discrete layers of metallic silver is less than about 300 nm For example, in some embodiments described herein, each discrete layer 106 of the plurality of discrete layers of metallic silver generally has a thickness T in the range from about 100 nm to about 250 nm (i.e., 100 nm≤T≤250 nm). In other embodiments the thickness T of each discrete layer 106 of the plurality of discrete layers is such that 50 nm≤T≤75 nm. The spacing S between adjacent layers of metallic silver is generally less than or equal to 500 nm (i.e., S≤500 nm). In some embodiments, the spacing S between adjacent layers may be less than or equal to 400 nm (i.e., S≤400 nm). In some other embodiments, the spacing S may be as small as 100 nm.

The plurality of discrete layers of metallic silver are generally spaced apart from the first surface 102 of the glass article 100 such that each discrete layer 106 is contained within the body 101 of the glass article 100 rather than on a surface of the glass article 100. Specifically, the first layer of the plurality of discrete layers (i.e., the discrete layer closest to the first surface 102 of the glass article) is spaced apart from the first surface 102 by a distance D which is less than or equal to 5 μm with each subsequent discrete layer spaced apart from one another by the spacing S. Forming the discrete layers 106 within the body 101 rather than on the surface of the glass body prevents the discrete layers 106 from being damaged and/or removed from the glass substrate thereby providing for a more robust glass article. Moreover, forming the discrete layers within the glass substrate facilitates spacing adjacent layers apart from one another such that optical cavities are formed between the layers which, in turn, facilitates the reflective and transmissive characteristics of the glass article.

In some embodiments, the glass article 100 may further include a layer of compressive stress which extends into the body of the glass article 100. The layer of compressive stress extends into the body of the glass article to a depth of layer (DOL). In embodiments described herein the depth of layer may be up to about 60 μm or more. For example, in some embodiments the depth of layer may be greater than 65 μm or even greater than 70 μm. The layer of compressive stress generally has a magnitude of compression C which is greater than or equal to 200 MPa. For example, in some embodiments the magnitude of compression in the layer of compressive stress may be greater than or equal to about 250 MPa or even greater than or equal to about 300 MPa. The magnitude of compression of the layer of compressive stress may be as great as 650 MPa or even 900 MPa. Accordingly, it should be understood that, in some embodiments, the magnitude of the layer of compressive stress may be in the range from about 200 MPa to about 900 MPa. The layer of compressive stress generally increases the strength of the glass article and enables the glass article to withstand a greater degree of surface damage, such as scratches, abrasions, and the like, without catastrophic failure.

While the glass article 100 is described herein as having a layer of compressive stress with a depth of layer of 60 μm and a magnitude of greater than 200 MPa, it should be understood that the layer of compressive stress may have a depth of layer of less than 60 μm and a magnitude of compression of less than 200 MPa. Moreover, it should be understood that, in some embodiments, the glass article 100 is formed without a layer of compressive stress, such as when the glass article is utilized in applications which do not require that the glass article have enhanced strength.

When the glass article 100 includes a layer of compressive stress, the layer of compressive stress may be formed in the glass article 100 prior to formation of the plurality of discrete layers of metallic silver. For example, in some embodiments, the plurality of discrete layers of metallic silver may be formed in a glass article which is compressively stressed in its as-received condition, such as when the glass article is manufactured from commercially available glass substrates with a layer of compressive stress. Examples of such glass articles include Gorilla® Glass manufactured by Corning, Inc.

However, in other embodiments, the glass article 100 may initially be without a layer of compressive stress in its as-received condition. In these embodiments, the layer of compressive stress may be introduced into the body 101 of the glass article 100 before the plurality of discrete layers of metallic silver are formed in the body 101. In some embodiments, the layer of compressive stress may be induced in the body of the glass article 100 by thermal tempering. In other embodiments, the layer of compressive stress may be induced in the glass article by chemical tempering, such as when the glass article is subjected to an ion exchange treatment.

For example, the glass article 100 may be formed from a glass composition which is suitable for ion exchange, as noted above. In one embodiment, the layer of compressive stress is induced in the glass substrate by positioning the glass substrate in a bath of molten salts, such as alkali metal salts. In this embodiment, the relatively larger alkali ions in the molten salt are exchanged with the relatively smaller sodium and/or lithium ions in the glass article. The resulting exchange of larger ions for smaller ions induces the compressive stress in the glass network of the article.

In one embodiment, the molten salt bath used for ion exchange contains $KNO_3$. The potassium ions in the $KNO_3$ are exchanged with smaller sodium ions in the glass article thereby compressively strengthening the glass article. The temperature of the salt bath may be in the range from about 250° C. to about 500° C. In some embodiments, the temperature of the salt bath may be in the range from about 300° C. to about 450° C. In order to achieve the desired depth and magnitude of compression, the glass article 100 may be held in the molten salt bath from about 4 hours to about 11 hours. In some other embodiments the hold time may be from about 4 hours to about 7 hours in order to achieve the desired depth and magnitude of compression.

Alternatively, the layer of compressive stress may be introduced in the glass substrate at the same time the silver is introduced into the glass article but before the plurality of discrete layers of silver are formed in the body of the glass article.

The plurality of discrete layers of metallic silver are formed in the body 101 of the glass article 100 utilizing an ion exchange treatment in conjunction with a thermal treatment performed in a reducing atmosphere. In one embodiment, the silver ions are introduced in the glass substrate by positioning the glass article in a molten salt bath containing silver ions to facilitate the exchange of the silver ions in the salt bath with ions in the glass article, such as sodium and/or lithium ions. In another embodiment, the silver ions are introduced in the glass article by applying a coating containing silver to a surface of the glass article and heating the glass article with the coating to promote the exchange of silver ions in the coating with ions in the glass article, such as sodium and/or lithium ions. The coating may be a paste comprising silver or a silver compound. Alternatively, the coating may be a thin film comprising silver or a silver compound which is deposited on the glass article by sputtering, vacuum deposition or a similar technique.

More specifically, in one embodiment, silver ions are introduced in the glass substrate through an ion exchange process which is performed in a bath of molten salt. The salt bath generally contains a silver salt, such as $AgNO_3$, $AgCl$ or the like, in addition to an alkali salt. For example, in one embodiment the molten salt bath comprises from about 0.05 wt. % to about 5 wt. % of a silver salt, such as $AgNO_3$ or the like, and from about 95 wt. % to about 99.5 wt. % of $MNO_3$, wherein M is an alkali metal ion such as such as, for example, potassium, sodium, rubidium, and/or cesium ions. In the embodiments described herein, M is either potassium or sodium. However, it should be understood that other alkali metal ions may be used in the salt bath which contains silver.

In embodiments where the glass article comprises a layer of compressive stress prior to exposure to the salt bath comprising silver ions, the alkali metal ion in the salt bath containing silver is potassium. However, in embodiments where the glass article does not comprise a layer of compressive stress prior to exposure to the salt bath comprising silver ions, the alkali metal ion in the salt bath containing silver may be either sodium or potassium. In this embodiment, potassium may be utilized as the alkali metal ion when it is desired to form a layer of compressive stress in the glass article through the exchange of sodium ions in the glass with potassium ions in the salt bath in addition to introducing silver ions into the glass article.

The salt bath containing silver ions is maintained at a bath temperature from about 300° C. to about 500° C. to facilitate the ion exchange process. In some embodiments, the bath temperature may be from about 300° C. to less than or equal to about 450° C. to facilitate the ion exchange process. The glass article is held in the salt bath containing silver ions for an ion exchange period P which is greater than or equal to about 5 minutes and less than or equal to 1 hour in order to achieve the desired concentration of silver ions in the body of the glass substrate. In some embodiments the ion exchange period P may be less than or equal to 0.5 hours or even less than or equal to 0.25 hours. The temperature of the salt bath containing silver ions and the ion exchange period P may be adjusted to obtain the desired concentration of silver ions. Following the ion exchange process, the glass article may be substantially clear or have a slightly yellow tint as a result of the presence of the silver ions in the glass substrate.

After the silver ions are introduced into the glass article, the glass article is removed from the bath and positioned in a reducing atmosphere, such as flowing hydrogen gas, and simultaneously heated to promote the precipitation and growth of metallic silver in the body of the glass article which subsequently creates the plurality of discrete layers of metallic silver in the glass substrate, as depicted in FIGS. 1 and 2. The combination of the ion exchange time in the salt bath containing silver ions and the treatment time in the reducing atmosphere dictate the number of layers formed in the glass substrate.

For example, the glass substrate may be positioned in a tube furnace through which hydrogen gas is flowing. The glass substrate is then heated to a reducing temperature which is from about 250° C. to about 600° C. and held at this temperature for a treatment period Q which is greater than or equal to 5 minutes and less than or equal to about 50 hours. In embodiments where the glass article includes a layer of compressive stress, the reducing temperature is less than or equal to about 300° C. to minimize the relaxation of the compressive stress.

While not wishing to be bound by theory, it is believed that the Turing Instability Theorem may be utilized to model the formation of the plurality of discrete layers of metallic silver in the glass substrate during the reduction treatment. The Turing Instability Theorem suggests that knowing the stable properties of a linear system of differential equations Y=DX and Y=D'X does not necessarily allow one to determine the stability of the system Y=(D+D')X. With respect to the formation of the plurality of discrete layers of metallic silver in the glass substrate during the reduction treatment, the two stable linear differential equations correspond to the nucleation of metallic silver in the body of the glass article and the growth of the metallic silver into the plurality of discrete layers of metallic silver.

Since the ion exchange process takes place uniformly over the surface of the glass plate and the surface area is large compared with the edges, the diffusion of hydrogen and subsequent reaction can be approximated using x which is the distance perpendicular to the planar glass surface. A series of dynamic equations representative of the interaction between the silver ions and the reducing atmosphere and the subsequent formation of the layers of metallic silver can be expressed in terms of the concentration of silver ions A in the glass article, the concentration of uncharged silver atoms S in the glass article, and the concentration of hydrogen molecules H in the glass article. The reaction of hydrogen and silver ions results in an uncharged silver atom ($Ag^0$). This is considered a nucleation reaction—silver nucleates from the interaction of silver ions and hydrogen. This nucleation process requires a threshold value of the concentration product of the silver ions and hydrogen, AH, which can be referred to as $K_S$. This threshold reaction can be approximated with a Heaviside step function. Additionally, the growth of the silver metal is assumed to be proportional to the silver metal concentration and the silver ion and hydrogen concentration, AHS.

The concentration of each of A, H, and S follow a diffusion equation with a reaction term to account for the conversion of silver ions to silver metal by reduction with hydrogen. The diffusion of the silver metal is assumed to be small, so that in the equations below, $D_S \cong 0$.

$$\frac{\partial}{\partial t}A(x,t) = D_A \frac{\partial^2}{\partial x^2}A(x,t) - AH[k_1 H(AH - K_S) + k_2 S],$$

$$\frac{\partial}{\partial t}H(x,t) = D_H \frac{\partial^2}{\partial x^2}H(x,t) - AH[k_1 H(AH - K_S) + k_2 S],$$

$$\frac{\partial}{\partial t}S(x,t) = D_S \frac{\partial^2}{\partial x^2}S(x,t) + AH[k_1 H(AH - K_S) + k_2 S],$$

In these equations $D_A$ is the diffusion constant of the silver ion, $D_H$ is the diffusion constant of hydrogen, $D_s$ is the diffusion constant for silver metal, H( ) is the Heaviside step function, $k_1$ is the nucleation reaction rate, and $k_2$ is the silver growth rate.

The time can be normalized by the diffusion of the hydrogen and the length of the sample while the spatial coordinates can be normalized by the sample length such that:

$$\tau = \frac{D_H t}{L^2}$$

-continued $$\hat{x} = \frac{x}{L}.$$

Similarly, the concentrations of A, H, and S can be normalized to the initial concentrations such that:

$$a(x, t) = \frac{A(x, t)}{A(t = 0)}; h(x, t) = \frac{H(x, t)}{H(t = 0)}; s(x, t) = \frac{S(x, t)}{A(t = 0)}.$$

The rate constants can be similarly normalized such that:

$$D = \frac{D_A}{D_H}; C_{th} = \frac{K_S}{A(t = 0)H(t = 0)}; \kappa = \frac{k_1 A(t = 0)L^2}{D_H};$$

$$\gamma = \frac{k_2 A(t = 0)}{k_1}; \sigma = \frac{H(t = 0)}{A(t = 0)}$$

where $A_{00}=A(x=0, t=0)$ and $H_{00}=H(x=0, t=0)$. These normalizations lead to a set of dimensionless equations:

$$\frac{\partial}{\partial \tau} a(\hat{x}, \tau) = D \frac{\partial^2}{\partial x^2} a(\hat{x}, \tau) - \sigma \kappa a h[H(ah - C_{th}) + \gamma s]$$

$$\frac{\partial}{\partial \tau} h(\hat{x}, \tau) = \frac{\partial^2}{\partial x^2} h(\hat{x}, \tau) - \kappa a h[H(ah - C_{th}) + \gamma s]$$

$$\frac{\partial}{\partial \tau} s(\hat{x}, \tau) = \sigma \kappa a h[H(ah - C_{th}) + \gamma s]$$

The initial concentration of silver ions can be estimated at $x=0$, $t=0$ by assuming an initial 13 wt. % percent sodium concentration in the glass article. If all the sodium at the surface is replaced by silver, then the surface of the glass article would have the same molar density of silver as the initial molar density of sodium. Specifically:

$$\frac{\text{Na wt \%} \times \text{glass density}}{\text{Na atomic weight}} =$$

Na density moles/vol = Ag density moles/vol, $$\frac{0.13 \times 2.5 \text{ g/cm}^3}{22.98977 \text{ g/mole}} = 1.4 \times 10^{-2} \text{ moles/cm}^3.$$

The initial hydrogen concentration is based on 1 atmosphere of $H_2$ at a temperature of 400° C. such that:

$$\frac{n}{V} = \frac{P}{RT} =$$

$$\frac{1 \text{ atm}}{(82.05746 \text{ cm}^3 \text{atm} K^{-1} \text{mol}^{-1}) \times (400 + 273)K} = 1.8 \times 10^{-5} \text{moles/cm}^3$$

This gives a ratio of silver ions in the glass to hydrogen molecules at the surface of 780:1. Thus, the parameter $\sigma \cong 1/780 = 1.3 \times 10^{-3}$.

From the diffusion coefficient of silver ions in the glass the dispersion coefficient for the silver ions at 400° C. can be estimated to be roughly $3.65 \times 10^{-10}$ cm²/sec. The diffusion of hydrogen in glass follows the expression $$D_H(T) = 5.65 \times 10^{-4} \exp(-5237 \, K/T) \, [\text{cm}^2/\text{sec}]$$

thus the $D_H$ at 400° C. is $2.36 \times 10^{-7}$ cm²/sec. So, the ratio of $D=D_A/D_H=1.55 \times 10^{-3}$. Based on the foregoing model, certain relationships between the concentration of silver and the concentration of hydrogen in the glass article must be satisfied in order to initiate and maintain growth of the layers of metallic silver. Specifically, Table 1 below contains suitable values for some of the various parameters which enable the formation and growth of the plurality of silver layers. In particular, it should be understood that the interplay between $\sigma$, $\gamma$ and $C_{th}$ establish the onset of the instability which leads to the precipitation and growth of the discrete layers of metallic silver in the glass. Moreover, the growth rate of the plurality of silver layers should be much greater than the nucleation rate (i.e., $\gamma \gg 1$). In addition the threshold concentration $C_{th}$ of silver should be greater than zero.

TABLE 1

| Parameter | Expression | Value |
|---|---|---|
| D | $D_A/D_H$ | $1.55 \times 10^{-3}$ |
| $\sigma$ | $H(x = 0, t = 0)/A(x = 0, t = 0)$ | $1.3 \times 10^{-3}$ |
| $\gamma$ | $k_2 A(0, 0)/k_1$ | >1 |
| $C_{th}$ | $K_S/[A(0, 0) \, H(0, 0)]$ | $0 < C_{th}$ |

In some embodiments, following the formation of the plurality of discrete layers of metallic silver in the body of the glass substrate, the glass article may be etched in an acid solution to adjust the reflectance characteristics of the glass article and thereby obtain a desired reflectance and/or transmittance for certain wavelengths of electromagnetic radiation incident on the glass article. The etching process selectively removes glass from the glass article as well as the discrete layers of metallic silver formed in the glass article. Accordingly, by controlling the concentration of the acidic solution and/or the time for which the acidic solution is applied to the glass article, the reflectance and/or transmittance properties of the glass article can be controlled.

In some embodiments, the acid solution used to selectively remove glass and layers of metallic silver may comprise a solution of hydrofluoric acid (HF) and sulfuric acid ($H_2SO_4$). For example, in some embodiments, the acid solution may comprise 5 wt. % HF and 3 wt. % $H_2SO_4$. In these embodiments, the etching time may be from about 0.1 min to about 5 minutes. However, it should be understood that the etching time may be shorter or longer depending upon the desired reflectance/transmittance properties of the glass article and the initial treatment conditions for forming the plurality of discrete layers of metallic silver in the glass article. Moreover, it should also be understood that an acid solution comprising HF and $H_2SO_4$ is one exemplary embodiment of an acid solution that may be used to selectively remove glass and discrete layers of metallic silver from the glass article and that others suitable solutions and/or etchants may be used to achieve the same effect.

EXAMPLES

The embodiments described herein will be further clarified by the following examples.

Example 1

Four glass plates (Samples A, B, C and D) formed from Corning glass code 2317 ion-exchangeable, alkali-aluminosilicate glass commercially available from Corning Incorporated were ion exchanged in a molten salt bath comprising 5 wt. % $AgNO_3$ and 95 wt. % $NaNO_3$ for 5 minutes at a temperature of 410° C. to introduce silver ions into the samples. None of the samples were ion exchanged prior to emersion in the $AgNO_3/NaNO_3$ bath. Thereafter, the samples were treated in flowing hydrogen gas at a temperature of 400° C. to facilitate the formation of a plurality of discrete layers of metallic silver in each sample. Sample A was treated for 10 minutes; Sample B was treated for 15 minutes; Sample C was treated for 25 minutes; and Sample D was treated for 60 minutes. An SEM image of a cross section of each sample was then captured with a scanning electron microscope to document the development of the discrete layers of metallic silver as a function of the hydrogen treatment time.

FIGS. 3A-3D are SEM micrographs through the cross section of Samples A-D, respectively. As illustrated by FIGS. 3A-3D, increasing the hydrogen treatment time results in the formation of additional discrete layers of metallic silver in the glass article which, in turn, varies the reflectance and transmittance characteristics of the glass article, as demonstrated in Example 2 below.

Example 2

Three glass plates (Samples AA, BB, CC) were ion exchanged in a molten salt bath comprising 5 wt. % $AgNO_3$ and 95 wt. % $NaNO_3$ to introduce silver ions into the glass plate. The temperature of the bath was 410° C. Sample AA was formed from Gorilla® Glass, an alkali-aluminosilicate glass commercially available from Corning Incorporated. Samples BB and CC were formed from Corning glass code 2317. None of the samples were ion exchanged prior to emersion in the $AgNO_3/NaNO_3$ bath. Each sample was ion exchanged in the $AgNO_3/NaNO_3$ bath for 5 minutes. Thereafter, the samples were treated in flowing hydrogen gas at a temperature of 400° C. to facilitate the formation of a plurality of discrete layers of metallic silver in each sample. Sample AA was subjected to the hydrogen gas treatment for 5 hours. Samples BB and CC were subjected to the hydrogen gas treatment for 10 minutes and 15 minutes, respectively.

Figure 4:
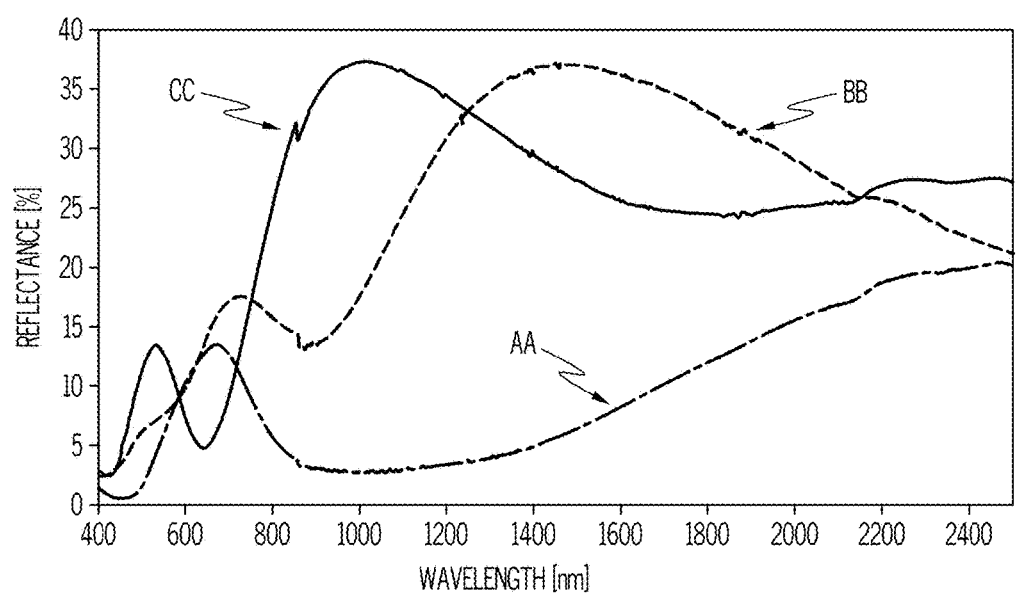
FIG. 4 graphically depicts the reflectance as a function of wavelength for glass articles subjected to different hydrogen treatment times.

Thereafter, the reflectance of each sample was measured for different wavelengths of electromagnetic radiation incident on each sample. FIG. 4 graphically depicts the reflectance (%) on the y-axis as a function of the wavelength of electromagnetic radiation incident on each sample. As shown in FIG. 4, the reflectance of each sample was dependent on the processing conditions to which each sample was subjected, with Sample CC having a peak reflectance of greater than 35% for infrared wavelengths between 800 nm and 1000 nm, Sample BB having a peak reflectance of greater than 35% for infrared wavelengths between about 1200 nm and 1600 nm, and Sample AA having a peak reflectance of greater than about 20% at infrared wavelengths greater than about 2200 nm.

Example 3

Two glass plates (Samples AAA, BBB) formed from Corning glass code 2317 were ion exchanged in a molten salt bath comprising 5 wt. % $AgNO_3$ and 95 wt. % $NaNO_3$ for 5 minutes to introduce silver ions into each sample. The temperature of the bath was 410° C. None of the samples were ion exchanged prior to emersion in the $AgNO_3/NaNO_3$ bath. Thereafter, the samples were treated in flowing hydrogen gas at a temperature of 400° C. to facilitate the formation of a plurality of discrete layers of metallic silver in each sample. Samples AAA and BBB were then subjected to the hydrogen gas treatment for 10 minutes and 15 minutes, respectively.

Figure 5:
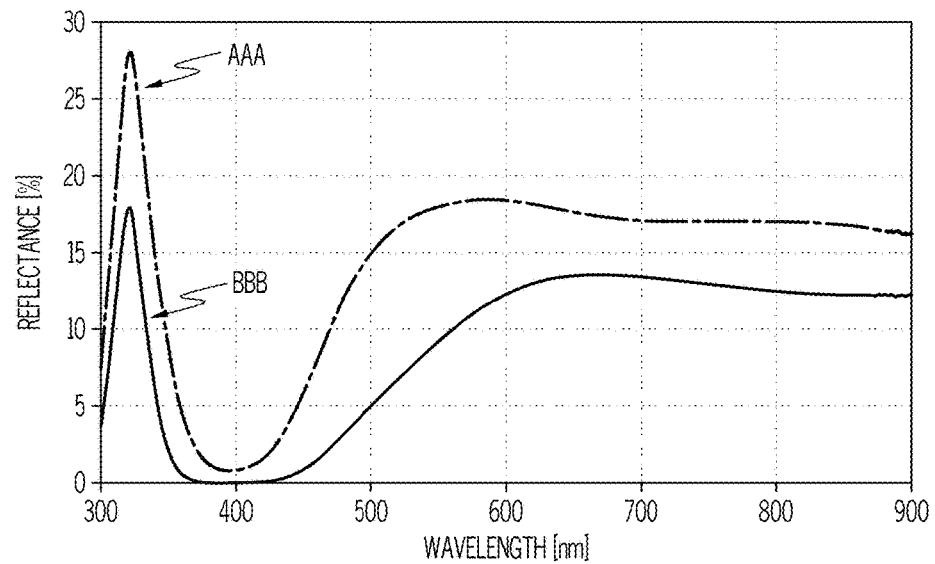
FIG. 5 graphically depicts the transmission as a function of wavelength for glass articles subjected to different hydrogen treatment times.

Thereafter, the transmittance of each sample was measured for different wavelengths of electromagnetic radiation incident on each sample. FIG. 5 graphically depicts the transmittance (%) on the y-axis as a function of the wavelength of electromagnetic radiation incident on each sample (x-axis). As shown in FIG. 5, the transmittance of each sample was dependent on the processing conditions to which each sample was subjected, with Sample AAA having a reflectance of greater than about 15% at visible wavelengths between about 500 nm and 900 nm and Sample BBB having a reflectance of greater than 10% at visible wavelengths between about 600 nm and 900 nm. Accordingly, based on the data contained in FIG. 5, the transmittance of the glass article for visible wavelengths decreases with longer hydrogen treatment times.

Example 4

Five glass plates (Samples A', B', C', D' E', and F') formed from Corning glass code 2317 were ion exchanged in a molten salt bath comprising 5 wt. % $AgNO_3$ and 95 wt. % $NaNO_3$ for 7 hours at 410° C. to introduce silver ions into each sample. None of the samples were ion exchanged prior to emersion in the $AgNO_3/NaNO_3$ bath. Thereafter, the samples were treated in flowing hydrogen gas at a temperature of 400° C. for 5 hours to facilitate the formation of a plurality of discrete layers of metallic silver in each sample. Each sample was then etched in an acid solution comprising 5 wt. % HF acid and 3 wt. % $H_2SO_4$ to selectively remove glass and discrete layers of metallic silver from each sample. Sample A' was etched for 0.5 minutes, Sample B' was etched 1.5 minutes, Sample C' was etched for 2 minutes, Sample D' was etched for 2.5 minutes, Sample E' was etched for 3.5 minutes, and sample F' was etched for 4.5 minutes. The reflectance of each sample was then measured for various wavelengths of incident electromagnetic radiation.

Figure 6:
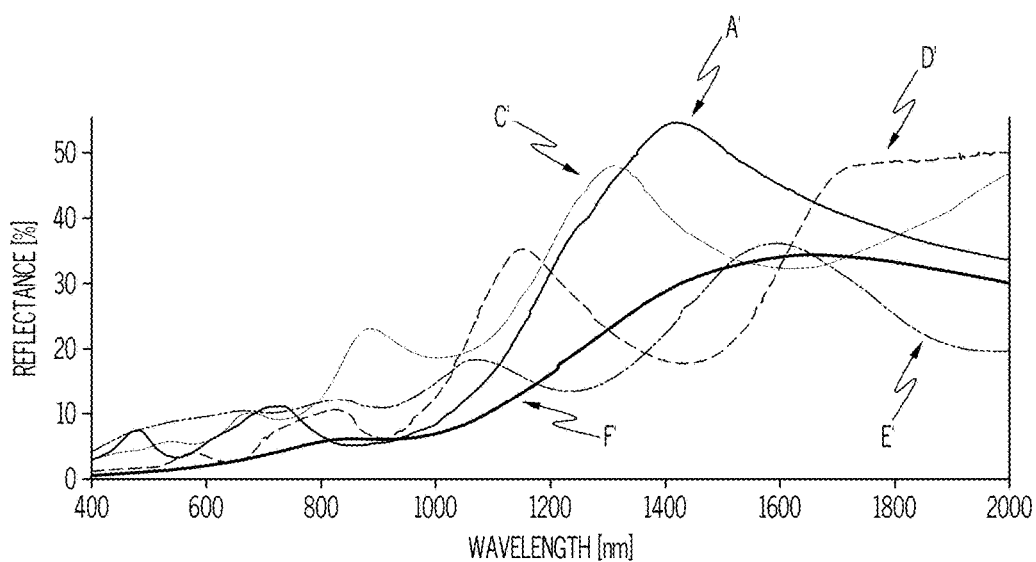
FIG. 6 graphically depicts the reflectance as a function of wavelength for glass articles etched for different etching times.
Figure 7:
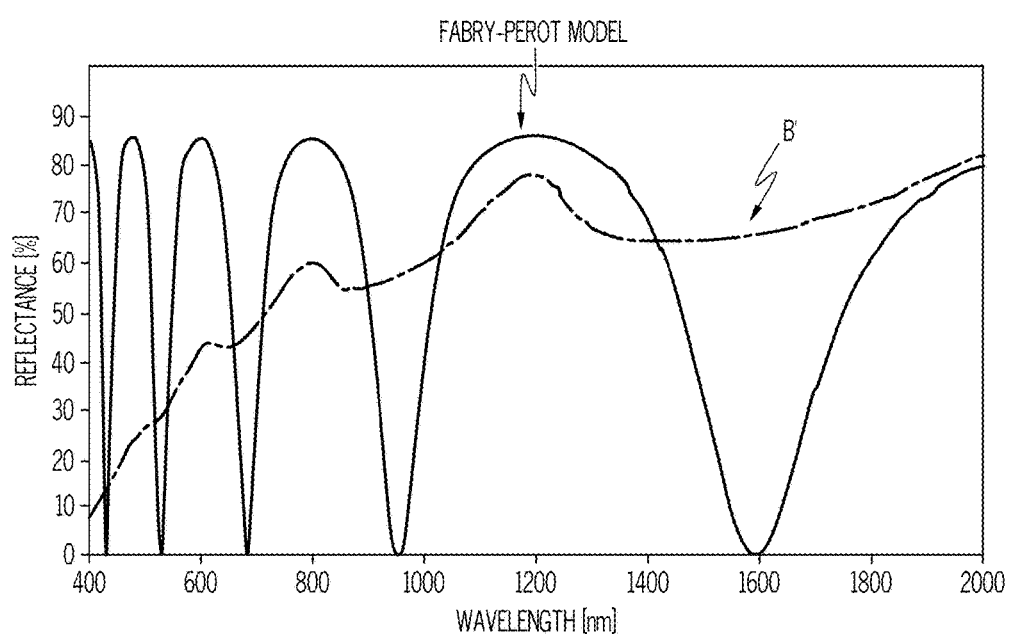
FIG. 7 graphically depicts the reflectance as a function of wavelength for a glass article subjected to an acid etch and the modeled reflectance of a Fabry-Perot resonator.

FIG. 6 graphically depicts the reflectance (y-axis) of samples A', C', D', E' and F' as a function of the wavelength of electromagnetic radiation incident on the substrate (x-axis). As shown in FIG. 6, the reflectance of the samples was related to the duration of the acid etch with longer durations generally decreasing the magnitude of the peak reflectance and shifting the peak reflectance to shorter wavelengths. FIG. 7 graphically depicts the reflectance (y-axis) of sample B' as a function of the wavelength of electromagnetic radiation incident on the substrate (x-axis). FIG. 7 also graphically depicts the reflectance for a Fabry-Perot resonator modeled under similar conditions. As shown in FIG. 7, the reflectance curve of Sample B' has a reflectance similar to that of the modeled Fabry-Perot resonator.

Based on the foregoing, it should now be understood that the glass articles described herein and comprising a plurality of discrete layers of metallic silver may be utilized as an infrared reflector while also permitting the transmission of visible wavelengths of electromagnetic radiation. The plurality of discrete layers of metallic silver which impart the reflectance characteristics to the glass substrate are contained within the body of the glass article. As such, the glass articles described herein are more robust and damage tolerant compared to reflectors which utilize surface coatings which may be easily damaged and/or removed.

Moreover, it should also be understood that the reflectance and transmittance characteristics of the reflectors described herein may be altered by controlling the processing conditions related to the formation of the plurality of discrete layers of metallic silver. It should also be understood that the reflectance and transmittance characteristics of the reflectors described herein may be altered by applying a post-formation etch to selectively remove glass and discrete layers of metallic silver.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A glass article, comprising:
   a first glass surface;
   a second glass surface;
   a glass body between the first and second glass surfaces, wherein the glass body is continuous with the first glass surface and the second glass surface such that the glass article is a single piece of glass; and
   a plurality of metallic silver layers within the glass body and spaced apart from one another within the glass body.

2. The glass article of claim 1, wherein the layers of metallic silver are spaced apart such that at least one optical cavity is formed therebetween, where the optical cavity acts as a Fabry-Perot resonator that produces high specular reflection of specific wavelengths of electromagnetic radiation incident on the glass article.

3. The glass article of claim 1, wherein the glass article reflects at least a portion of electromagnetic radiation incident on the glass article having a wavelength from 800 nm to 2500 nm and transmits at least a portion of electromagnetic radiation incident on the glass article having a wavelength from 390 nm to 750 nm.

4. The glass article of claim 1, wherein the glass article comprises a glass composition that is ion-exchangeable.

5. The glass article of claim 1, wherein the glass article includes a layer of compressive stress which extends into the body of the glass article.

6. The glass article of claim 5, wherein the layer of compressive stress extends into the body of the glass article to a depth of layer of up to about 60 µm.

7. The glass article of claim 5, wherein the compressive stress has a magnitude of greater than 200 MPa.

8. The glass article of claim 1, wherein the glass article has curvature.

9. The glass article of claim 8, wherein the curvature is along length dimensions of the glass article.

10. The glass article of claim 8, wherein the curvature is along width dimensions of the glass article.

11. The glass article of claim 8, wherein the glass article is glazing.

12. The glass article of claim 11, wherein the glazing is a window, windshield, and/or roof panel.

13. The glass article of claim 11, wherein the glazing is automobile glazing.

14. The glass article of claim 1, wherein the first glass surface and the second glass surface are parallel with one another.

15. The glass article of claim 14, wherein the glass article is glazing.

16. The glass article of claim 15, wherein the glazing is a window.

17. The glass article of claim 16, wherein the window is a building window.

18. A glass article, comprising first and second glass surfaces and a glass body therebetween, wherein the glass body is a single piece of glass comprising metallic silver layers spaced apart from one another within the glass body.

* * * * *

UNITED STATES PATENT AND TRADEMARK OFFICE
CERTIFICATE OF CORRECTION

PATENT NO.        : 9,975,805 B2
APPLICATION NO.   : 15/276097
DATED             : May 22, 2018
INVENTOR(S)       : Nicholas Francis Borrelli et al.

It is certified that error appears in the above-identified patent and that said Letters Patent is hereby corrected as shown below:

On the Title Page

In Column 2, item (56), other publications, Line 1, delete ""Ulratrafine measurements" and insert -- "Ultrafine measurements --, therefor.

Signed and Sealed this
Nineteenth Day of November, 2019

Andrei Iancu
*Director of the United States Patent and Trademark Office*